United States Patent
Stutz et al.

(10) Patent No.: US 10,053,249 B2
(45) Date of Patent: Aug. 21, 2018

(54) METHOD FOR TRANSPORTING A PACKAGING SHELL OF AN OPHTHALMIC LENS PACKAGE

(71) Applicant: Novartis AG, Basel (CH)

(72) Inventors: Michael Stutz, Kleinwallstadt (DE); Ulrike Schultheiss, Offenbach (DE); Katrin Sylke Struckmeier, Aschaffenburg (DE)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 15/346,053

(22) Filed: Nov. 8, 2016

(65) Prior Publication Data

US 2017/0166338 A1    Jun. 15, 2017

Related U.S. Application Data

(60) Provisional application No. 62/267,317, filed on Dec. 15, 2015.

(51) Int. Cl.
*B65G 47/91* (2006.01)
*B65B 43/46* (2006.01)
(Continued)

(52) U.S. Cl.
CPC .......... *B65B 43/46* (2013.01); *A45C 11/005* (2013.01); *B25J 15/0683* (2013.01);
(Continued)

(58) Field of Classification Search
CPC ....... B65G 47/91; B25J 15/06; B25J 15/0616; B65B 25/008; B29D 11/0024; A45C 11/005
(Continued)

(56) References Cited

U.S. PATENT DOCUMENTS 4,763,941 A * 8/1988 Sniderman ............ B65G 47/91
                                                271/103
5,623,816 A    4/1997 Edwards et al.
(Continued)

FOREIGN PATENT DOCUMENTS

DE    102013009344 A1    12/2014

*Primary Examiner* — Douglas A Hess
(74) *Attorney, Agent, or Firm* — Sheng-Hsin Hu

(57) ABSTRACT

A method for transporting a packaging shell (1) of an ophthalmic lens package comprises the steps of
at a start location providing a packaging shell (1) comprising a depression (10), and a flange (11) completely surrounding the depression (10),
providing a suction cup (2) having an opening (21) at a distal end thereof, which is completely surrounded by a rim (22) sized and shaped to engage the flange (11) in an engagement area completely enclosing the depression (10),
positioning the suction cup (2) and the packaging shell (1) such that the rim (22) and the engagement area of the flange (11) face each other,
moving the suction cup (2) and the packaging shell (1) towards each other,
applying suction through the opening (21) of the suction cup (2),
moving the suction cup (2) with the packaging shell (1) adhered thereto to the destination location,
at the destination location releasing the suction,
wherein a flexible sealing gasket (3) is arranged at the rim (22) to sealingly engage the flange (11) in the engagement area.

9 Claims, 2 Drawing Sheets

(51) Int. Cl.
   | | |
   |---|---|
   | *A45C 11/00* | (2006.01) |
   | *B25J 15/06* | (2006.01) |
   | *B29D 11/00* | (2006.01) |
   | *B65B 25/00* | (2006.01) |

(52) U.S. Cl.
   CPC .. *B29D 11/00125* (2013.01); *B29D 11/00173* (2013.01); *B29D 11/00259* (2013.01); *B65B 25/008* (2013.01); *B65G 47/91* (2013.01)

(58) Field of Classification Search
   USPC ....... 414/627, 737, 752.1; 279/3; 198/468.4, 198/471.1, 689.1, 803.5; 901/40; 294/64.3, 183, 189
   See application file for complete search history.

(56) References Cited

U.S. PATENT DOCUMENTS

| | | | |
|---|---|---|---|
| 5,658,602 A | 8/1997 | Martin et al. | |
| 5,749,205 A | 5/1998 | Edwards et al. | |
| 6,012,471 A | 1/2000 | Calvin | |
| 6,364,386 B1* | 4/2002 | Quick | H05K 13/0408 29/743 |
| 6,977,051 B2* | 12/2005 | Pegram | B29D 11/00259 264/1.1 |
| 7,731,873 B2* | 6/2010 | Darnton | B29D 11/00038 264/1.36 |
| 8,534,633 B2* | 9/2013 | Tell | B25J 15/0616 248/205.5 |
| 2002/0056190 A1 | 5/2002 | Arakawa et al. | |
| 2003/0031548 A1 | 2/2003 | King et al. | |
| 2010/0172724 A1 | 7/2010 | Hawkes et al. | |

* cited by examiner

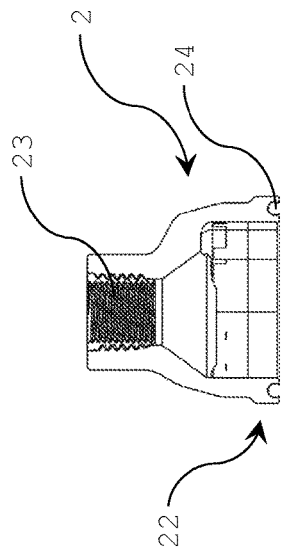
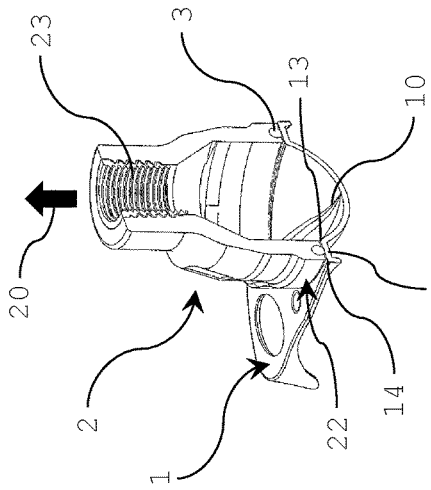
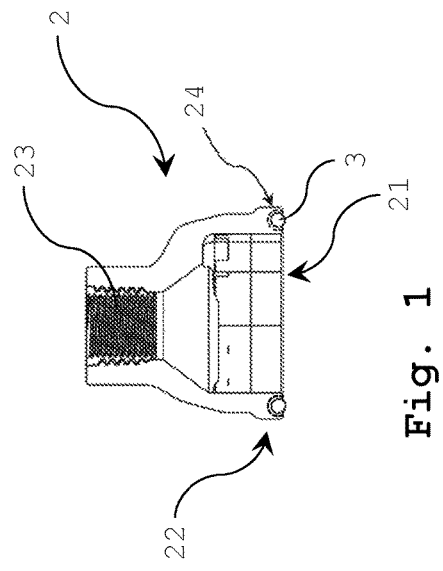
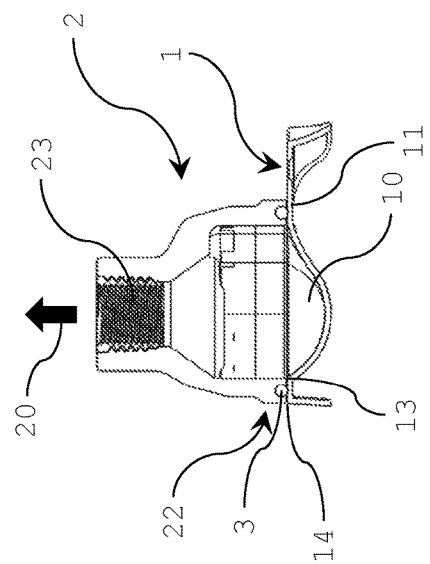

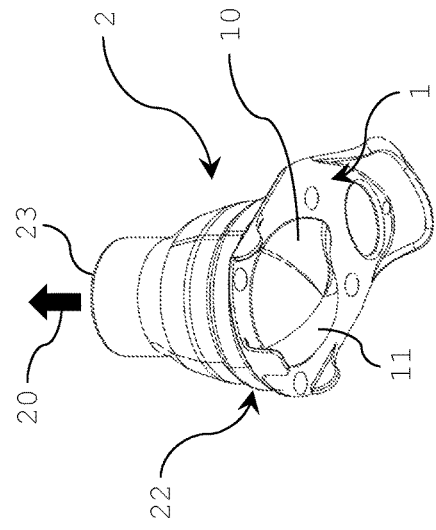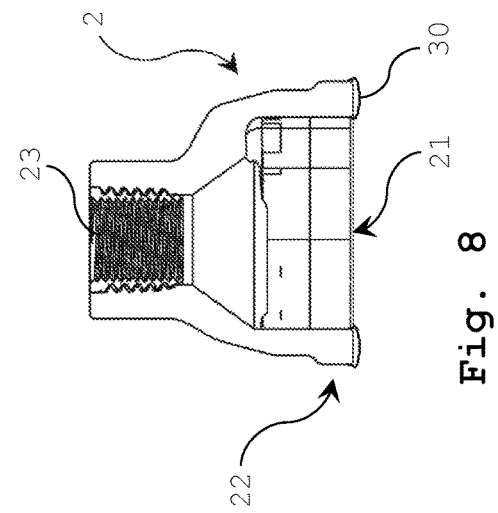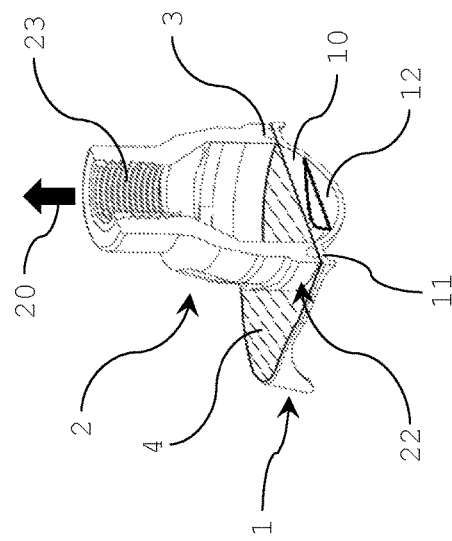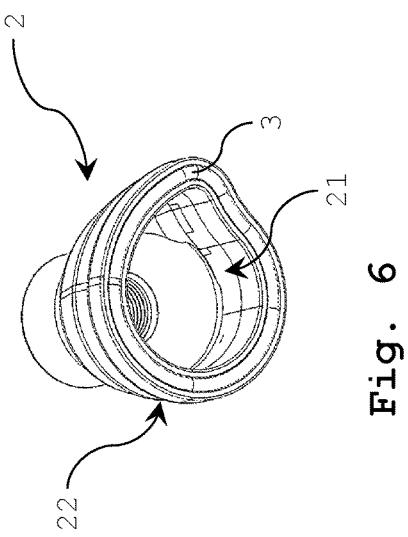

METHOD FOR TRANSPORTING A PACKAGING SHELL OF AN OPHTHALMIC LENS PACKAGE

This application claims the benefit under 35 U.S.C. § 119(e) of U.S. provisional Application No. 62/267,317 filed Dec. 15, 2015, the content of which are incorporated by reference in its entirety.

FIELD OF THE INVENTION

The invention relates to a method and to a system for transporting a packaging shell of an ophthalmic lens package.

BACKGROUND OF THE INVENTION

It is well-established to manufacture ophthalmic lenses, and in particular contact lenses such as soft contact lenses, in a fully automated manufacturing process. In this process, the contact lenses are typically molded by polymerizing and/or cross-linking a starting material so as to form the contact lens. Depending on the starting material used, it may be required or desired to place the lens in one or more treatment liquids, such as extraction liquids, rinsing liquids and/or coating liquids. Thereafter, the contact lenses are inspected and in case the contact lenses successfully pass the inspection, the lenses are further processed in a packaging unit. In the packaging unit, the contact lenses that have successfully passed the inspection are transferred into packaging shells which, by way of example, may be made of a thermoplastic material, for example polypropylene, through injection molding and which comprise a depression configured to contain a storage solution and a said inspected contact lens.

During packaging, a packaging shell is transferred from a station where packaging shells are provided towards a package holder. Once being placed in the package holder, a contact lens that has successfully passed the inspection step is placed into the depression of the packaging sheet and a storage solution is introduced into the depression, too, so that the contact lens is immersed in the storage solution. Thereafter, a cover film is placed onto the packaging shell containing the contact lens immersed in the storage solution, and the cover film is then thermally sealed to the packaging shell, thereby forming sealed blister packages. After printing information on the cover foil and after a number of possible additional steps, the sealed blister packages are then autoclaved before the autoclaved final blister package is ready for distribution. In the production of large numbers of contact lenses as is the case with disposable contact lenses, it is necessary to be able to manipulate the packaging shells as well as the sealed blister packages safely, quickly and efficiently.

Grippers known in the art for this purpose include a gripper head having vacuum orifices arranged in the gripper head. The gripper head is moved into the depression of the packaging shell, and vacuum is then applied through the vacuum orifices in the gripper head. Once vacuum is applied the wall of the depression adheres to the gripper head, and the packaging shell adhered to the gripper head is transported to and placed on a package holder for supporting the packaging shell during the packaging process. During transportation, packaging shells may slightly move relative to the gripper head, or they may not adhere to the gripper head properly centered, so that upon placing the packaging shell on the package holder (support) breakage of the packaging shell may occur. A broken packaging shell on the package holder (support) cannot be tolerated and must be removed from the package holder and replaced by an undamaged packaging shell, thus reducing the efficiency of the automated process.

Therefore, during gripping and transportation of the packaging shell and during placement of the packaging shell on the package holder, care must be taken to ensure that the packaging shells are correctly positioned and centered.

SUMMARY OF THE INVENTION

These and other objects are met by a method and a system for transporting the packaging shell of an ophthalmic lens package as they are specified in the respective independent claim. Advantageous embodiments of the methods and of the gripper according to the invention are the subject of the dependent claims.

Accordingly, one aspect of the invention is related to a method for transporting a packaging shell of an ophthalmic lens package, such as a contact lens package, in particular a soft contact lens package, from a start location to a destination location, the method comprising the steps of at a start location providing a packaging shell comprising a depression for accommodating an ophthalmic lens and a storage solution, the packaging shell further comprising a flange completely surrounding the depression, providing a suction cup having an opening at a distal end of the suction cup, the opening of the suction cup being completely surrounded by a rim having a size and shape adapted to engage the flange of the packaging shell in an engagement area completely enclosing the depression of the packaging shell, positioning the suction cup and the packaging shell relative to one another such that the rim of the suction cup and the engagement area of the flange of the packaging shell are arranged facing each other, moving the suction cup and the packaging shell towards each other, applying suction through the opening of the suction cup to make the flange of the packaging shell adhere to the rim of the suction cup in the engagement area such that the engagement area completely encloses the depression of the packaging shell, moving the suction cup with the packaging shell adhered to the suction cup to the destination location, at the destination location releasing the suction applied through the opening of the suction cup so as to release the packaging shell from the suction cup, wherein the step of providing the suction cup includes arranging a flexible sealing gasket at the rim of the suction cup, the flexible sealing gasket being adapted to sealingly engage the flange of the packaging shell in the engagement area.

According to another aspect of the method according to the invention, the suction is applied through the opening of the suction cup already during movement of the packaging shell and the suction cup towards each other.

According to a further aspect of the method according to the invention, the step of at the destination location releasing the suction applied through the opening of the suction cup includes applying overpressure through the opening of the suction cup.

According to still a further aspect of the method according to the invention, the shape of the flange at a boundary of the depression and the shape of the rim of the suction cup correspond to one another, with the size of the rim of the suction cup being larger than the size of the flange at the boundary of the depression while being smaller than an outer boundary of the flange of the packaging shell.

According to yet a further aspect of the method according to the invention, the flexible sealing gasket is an O-ring.

Still in accordance with a further aspect of the method according to the invention, the rim of the suction cup comprises a groove, and wherein an upper portion of the flexible sealing gasket is mounted in the groove, while a lower portion of the flexible sealing gasket axially protrudes from the rim of the suction cup.

In accordance with another aspect of the method according to the invention, the suction cup has a vacuum inlet for applying the suction to the opening of the suction cup.

In a particular aspect of the invention, the suction (underpressure) is in the range of 200 hPa to 900 hPa (corresponding to 200 millibars to 900 millibars, or 0.2 bar to 0.9 bar).

In another particular aspect of the invention, the flexible sealing gasket is made of an elastomer, particularly silicone rubber.

According to another aspect of the method according to the invention, the packaging shell to be transported comprises a cover film bonded to the packaging shell.

As regards the system for transporting a packaging shell of an ophthalmic lens package, such as a contact lens package, in particular a soft contact lens package, from a start location to a destination location, the system comprises:
  a packaging shell comprising a depression for accommodating an ophthalmic lens and a storage solution, the packaging shell further comprising a flange completely surrounding the depression,
  a suction cup having an opening at a distal end of the suction cup and a rim completely surrounding the opening, the rim having a size and shape for engaging the flange of the packaging shell in an engagement area completely enclosing the depression, the suction cup further comprising a vacuum inlet,
  an actuator for moving the suction cup
  a vacuum line connected to the a vacuum inlet of the suction cup,
  a flexible sealing gasket fixedly arranged at the rim of the suction cup in a manner so as to axially protrude from the rim.

According to one aspect of the system according to the invention, the rim of the suction cup comprises a groove, and the flexible sealing gasket is formed by an O-ring comprising an upper portion and a lower portion, the upper portion being mounted in the groove and the lower portion axially protruding from the rim of the suction cup for sealing by engaging the flange of the packaging shell in the engagement area completely enclosing the depression of the packaging shell.

According to a further aspect of the system according to the invention, the flexible sealing gasket corresponds in shape to the flange at a boundary of the depression.

The method according to the invention using a flexible sealing gasket allows for very gently gripping the sensitive packaging shell in order to avoid damage. Additionally, the use of the suction cup with the flexible sealing gasket according to the invention even allows for transportation of a packaging shell already containing a storage solution, for example a saline solution, for immersing a contact lens or even a packaging shell containing both the storage solution and the immersed contact lens. Furthermore, the method according to the invention results in the packaging shell being safely gripped and safely adhered to the suction cup despite the high-speed operation of a robot arm to which the suction cup may be attached, and despite vibrations that may result at the end of the robot arm. The packaging shell is stably held in position in order to maintain the position and orientation of the packaging shell from the moment the packaging shell is gripped at the start location until the time it is released (placed on the packaging holder) at the destination location.

While moving the suction cup and the packaging shell towards one another, their relative positioning is such that the rim of the suction cup and the engagement area of the flange of the packaging shell are arranged facing each other. In this relative position, the rim of the suction cup and the engagement area of the flange may be centered for accurate engagement (centered position). Alternatively, the relative position of the rim of the suction cup and the engagement area of the flange may deviate from the centered position, for example in case the engagement area of the flange is not axially aligned with the rim of the suction cup or in case the packaging shell is tilted from its regular gripping position (plane of the rim of the suction cup is parallel to the plane of the engagement area of the flange of the packaging shell), so that the plane of the rim and the plane of the engagement area of the packaging shell may not be exactly parallel at the time the suction cup approaches the packaging shell. Generally, the shape of the rim does not have to correspond to the shape of the flange surrounding the depression as long as the rim completely encloses the depression when engaging the flange of the packaging shell in the engagement area of the flange.

In the context of the application, the term "flexible sealing gasket" generally means that the gasket is made of a material which is more flexible (compressible) than the material the packaging shell is made of.

Suction may be applied through the opening of the suction cup either after the flexible sealing gasket has already engaged the flange of the packaging shell in the engagement area, or simultaneously at the time of engaging the flange, or may be applied before engaging the flange, for example during movement of the packaging shell and the suction cup towards each other. Particularly, applying suction before engaging the flange has the advantage that no accurate centering of the suction cup with respect to the packaging shell is needed. Rather, the suction forces lead to an aspiration of the packaging shell towards the rim of the suction cup such that the packaging shell is automatically centered when adhering to the suction cup, even when the plane formed by the engagement area of the flange of the packaging shell and the plane formed by the rim of the suction cup (in which the flexible sealing gasket is arranged) are not arranged parallel to one another when they are arranged in close proximity, i.e. when the packaging shell and the rim of the suction cup are slightly "tilted" relative to one another. This allows for a self-centering of the packaging shell with respect to the suction cup and enables a fast, efficient and reliable gripping and transportation of the packaging shell even without the need of an accurate centering of the suction cup with respect to the packaging shell prior to engaging the flange of the packaging shell.

Releasing the suction applied through the opening of the suction cup at the destination location is generally possible by simply releasing the vacuum applied, however, advantageously a slight overpressure is applied through the opening of the suction cup, thus resulting in rapid and reliable release of the packaging shell from the suction cup. For example, the applied overpressure may be in the range of up to 6 bars, in particular in the range of 100 hPa to 3000 hPa (100 millibars to 3000 millibars, or 0.1 bar to 3 bars).

While the flexible sealing gasket may be of any size and shape adapted to engage the flange of the packaging shell in the engagement area completely enclosing the depression of the packaging shell, the shape of the flange at a boundary of the depression and the shape of the rim of the suction cup advantageously correspond to one another. This aspect allows for an excellent gripping of the packaging shell.

The flexible sealing gasket may have any shape allowing to reliably engage the flange of the packaging shell. The use of an O-ring, however, allows for an easy and safe mounting of the flexible sealing gasket in a groove of the suction cup. For example, the upper portion of the O-ring may be mounted in a groove arranged in the rim of the suction cup, while a lower portion of the O-ring axially protrudes from the rim of the suction cup. In the context of the present application, "axially protruding" means protruding in the direction perpendicular to the plane formed by the rim of the suction cup.

Applying suction from a certain range of underpressure allows for a gentle, yet safe and reliable gripping of a packaging shell, typically not containing but optionally also containing a storage solution and/or an ophthalmic lens such as a contact lens. Also, it allows for the reliable gripping and transport of packaging shells containing the storage solution and the contact lens and in addition comprising a cover film bonded (e.g. sealed) to the packaging shells.

The advantages of the system according to the invention and of the various embodiments thereof correspond to those already discussed above in connection with the method according to the invention and the various embodiments. Therefore, they are not reiterated here.

BRIEF DESCRIPTION OF THE DRAWINGS

Further advantageous aspects of the invention become apparent from the following description of embodiments of the invention with the aid of the drawings, in which:

FIG. 1 shows a cross-sectional side view of a suction cup according to one embodiment of the method and system according to the invention;

FIG. 2 shows a cross-sectional side view of the suction cup of FIG. 1 without the flexible sealing gasket;

FIG. 3 shows a cross-sectional side view of the suction cup of FIG. 1 with a packaging shell adhering to the rim of the suction cup by suction;

FIG. 4 shows a cross-sectional perspective view of the suction cup of FIG. 1 with a packaging shell adhering thereto (similar to FIG. 3);

FIG. 5 shows a cross-sectional perspective view of a suction cup with an adhering packaging shell comprising a cover film bonded to the packaging shell;

FIG. 6 shows a perspective view from below of the suction cup of FIG. 1;

FIG. 7 shows a perspective view from below of the suction cup of FIG. 6 with a packaging shell adhering to the rim of the suction cup by suction; and FIG. 8 shows a cross-sectional side view of a suction cup according to a further embodiment of the method and system according to the invention.

DETAILED DESCRIPTION OF EMBODIMENTS

The following description of exemplary embodiments of the invention is for illustrative purposes only and is not intended to limit of the scope of the invention to the particular embodiments described.

FIG. 1 and FIG. 2 show cross-sectional side views of the suction cup 2 (with and without sealing gasket) according to one embodiment of the method and system according to the invention, while FIG. 6 shows a perspective view of the inventive suction cup 2 from below. The suction cup 2 may be mounted to an arm of a robot (not shown). The suction cup 2 comprises a hollow body with a threaded opening 23 arranged at the top of the suction cup 2 to form a vacuum inlet to which a vacuum supply line (not shown) can be connected.

The suction cup 2 further has an opening 21 arranged at its distal end opposite to the opening 23 forming the vacuum inlet. The opening 21 at the distal end of the suction cup 2 is completely surrounded by a rim 22 corresponding to the shape of the flange 11 of a packaging shell 1 (see FIG. 3, FIG. 7) to be transported from a start location to a destination location. The packaging shell 1 comprises a depression 10 for accommodating an ophthalmic lens and a storage solution 12, as well as a flange 11 completely surrounding the depression 10. A flexible sealing gasket formed by an O-ring 3 having an upper portion and a lower portion. The upper portion of the O-ring 3 is mounted in a groove 24 in the rim 22 of the suction cup 2 while the lower portion of the O-ring 3 axially protrudes from the rim 22 of the suction cup 2 (downwardly). The rim 22 has a size and shape adapted to engage the flange 11 of the packaging shell 1 in an engagement area completely enclosing the depression 10 of the packaging shell 1. In the embodiment shown, the shape of the O-ring 3 corresponds to the shape of the flange 11 at the boundary 13 of the depression 10. The size of the rim 22 of the suction cup to is larger than the size of the flange 11 at the boundary 13 of the depression 10 while being smaller than the outer boundary 14 of the flange 11 of the packaging shell 1, so that the rim 22 of the suction cup 2 does not project outwardly beyond the flange 14 of the packaging shell 1, as can be seen best in FIG. 3 and FIG. 4.

In operation (see FIG. 3 and FIG. 4), in order to grip a packaging shell 1 (in the embodiment shown an empty packaging shell 1) at a start location, the suction cup 2 is brought into proximity of the packaging shell 1. The opening 21 at the distal end of the suction cup 2 is positioned in the vicinity of the packaging shell 1 such that the rim 22 of the suction cup 2 and the engagement area of the flange 11 of the packaging shell 1 are arranged facing each other in a manner such that the contour of the engagement area of the flange 11 surrounding the depression 10 and the contour of the rim 22 of the suction cup 2 correspond to each other as regards their orientation. Although suction 20 may be applied only at the time the suction cup 2 actually engages the flange 11 of the packaging shell 1 or even thereafter, suction 20 advantageously is applied already while moving the suction cup 2 towards the packaging shell 1. The suction (underpressure) may be in the range of 200 hPa to 900 hPa (corresponding to 200 millibars to 900 millibars, or 0.2 bar to 0.9 bar). Applying the suction 20 already during the movement of the packaging shell 1 and the suction cup 2 towards each other allows for a self-centering of the packaging shell 1 relative to the rim 22 of the suction cup 2 as the packaging shell 1 is sucked towards the rim 22 of the suction cup 2.

At the time suction 20 is applied through the vacuum supply line through the opening 23 forming the vacuum inlet and through the interior of the suction cup 2 to the opening 21 at the distal end of the suction cup 2, the packaging shell 1 is aspirated to adhere to the suction cup 2 with the O-ring 3 arranged in the groove 24 of the rim 22 being in sealing contact with the engagement area of the flange 11 of the packaging shell 1. The packaging shell 1 is then very stably held in position adhered to the suction cup 2 from the moment the packaging shell 1 is gripped at the start location during transportation to the destination location until the time it is released again from the suction cup 2 at a destination location, so that in case the destination location is a package holder (support) the packaging shell 1 can be reliably transported to and placed on the package holder without getting broken.

At the destination location, the packaging shell 1 is released by releasing the suction 20 applied through the opening 23 forming the vacuum inlet and by supplying a slight overpressure instead, which, by way of example, maybe in the range of 100 hPa to 3000 hPa (100 millibars to 3000 millibars, or 0.2 bar to 3 bars), but generally may be in the range of up to 6 bars. Thus, the packaging shell 1 can be released quickly and reliably. Although the O-ring 3 may remain in mechanical contact with the packaging shell 1 before removing the suction cup 2 from the packaging shell 1 at the destination location, the O-ring 3 does no longer adhere to the packaging shell 1 (or vice versa). Once the packaging shell 1 is released, the suction cup 2 is removed from the packaging shell 1 at the destination location and is moved back to the start location for gripping another packaging shell 1 to be transported to the destination location.

In FIG. 3, FIG. 4, and FIG. 7 the state is shown in which the packaging shell 1 adheres to the suction cup 2 while vacuum 20 is applied through the opening 23 forming the vacuum inlet. The flexible O-ring 3 provides for a gentle gripping action on one hand which does not damage the packaging shell 1, while still enabling a sufficiently strong gripping action to allow for a reliable transportation of the packaging shell 1 in a stable position relative to the suction cup 2. The gripping action provides for maximum gripping stability and prevents the grip from being released even during the quick movement and vibrations of the robot as it moves the suction cup 2 with the packaging shell 1 adhered thereto from the starting location to the destination location.

As is evident, the method also allows for the transportation of packaging shells 1 already containing a storage solution 12 such as a saline solution or the like for the immersion of a contact lens and is even suitable for the gripping and transportation of a packaging shell 1 containing a contact lens immersed in the storage solution 12. Also, as is evident from FIG. 5, the method according to the invention allows for the transportation of packaging shells 1 which are already sealed by a cover film 4 and which in the depression 10 contain a contact lens immersed in a storage solution 12 such as a saline solution.

In FIG. 8 another embodiment of the suction cup 2 of the method and system according to the invention is shown. In essence, this embodiment of the suction cup 2 is different from the afore-described embodiment in that the flexible sealing ring 30 covers the entire rim 22 of the suction cup 2 facing the flange 11 of the packaging shell 1.

In both embodiments, the suction cup 2 may be made of a solid, noncorrosive material like stainless steel or an adequate synthetic material. The O-ring 3 or the flexible sealing ring 3, respectively, may be made of an elastomer such as silicone rubber.

The invention has been described with reference to the embodiments shown in FIG. 1 to FIG. 8. However, for the skilled person it is evident that many changes and modifications can be made without departing from the general teaching underlying the invention. Therefore, the scope of protection is not intended to be limited to the embodiments described but rather is defined by the appended claims.

The invention claimed is:

1. Method for transporting a packaging shell (1) of an ophthalmic lens package from a start location to a destination location, the method comprising the steps of
   at a start location providing a packaging shell comprising a depression for accommodating an ophthalmic lens and a storage solution, the packaging shell further comprising a flange completely surrounding the depression,
   providing a suction cup having an opening at a distal end of the suction cup the opening of the suction cup being completely surrounded by a rim having a size and shape adapted to engage the flange of the packaging shell in an engagement area completely enclosing the depression of the packaging shell,
   positioning the suction cup and the packaging shell relative to one another such that the rim of the suction cup and the engagement area of the flange of the packaging shell are arranged facing each other,
   applying suction through the opening of the suction cup to make the flange of the packaging shell adhere to the rim of the suction cup in the engagement area such that the engagement area completely encloses the depression of the packaging shell,
   moving the suction cup with the packaging shell adhered to the suction cup to the destination location,
   at the destination location releasing the suction applied through the opening of the suction cup so as to release the packaging shell from the suction cup,
   wherein the step of providing the suction cup includes arranging a flexible sealing gasket at the rim of the suction cup the flexible sealing gasket, being adapted to sealingly engage the flange of the packaging shell in the engagement area.

2. Method according to claim 1, wherein the step of at the destination location releasing the suction applied through the opening of the suction cup includes applying overpressure through the opening of the suction cup.

3. Method according to claim 1, wherein the shape of the flange of the depression and the shape of the rim of the suction cup correspond to one another, with the size of the rim of the suction cup being larger than the size of the flange at the boundary of the depression while being smaller than an outer boundary of the flange of the packaging shell.

4. Method for transporting a packaging shell according to claim 1, wherein the flexible sealing gasket is an O-ring.

5. Method for transporting a packaging shell according to claim 1, wherein the rim of the suction cup comprises a groove, and wherein an upper portion of the flexible sealing gasket is mounted in the groove, while a lower portion of the flexible sealing gasket axially protrudes from the rim of the suction cup.

6. Method for transporting a packaging shell according to claim 1, wherein the suction cup has a vacuum inlet for applying the suction to the opening of the suction cup.

7. Method for transporting a packaging shell according to claim 1, wherein the suction is in the range of 200 hPa to 900 hPa.

8. Method for transporting a packaging shell according to claim 1, wherein the flexible sealing gasket is made of an elastomer, particularly silicone rubber.

9. Method for transporting a packaging shell according to claim 1, wherein the packaging shell to be transported comprises a cover film bonded to the packaging shell.

* * * * *